Figure 3:
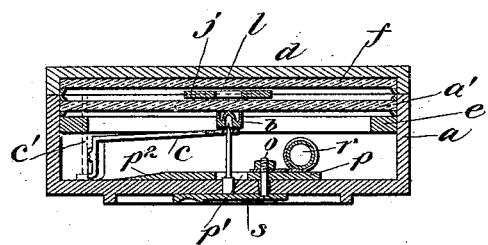

(No Model.)  D. W. BRUNTON.  2 Sheets—Sheet 1.
POCKET TRANSIT.
No. 526,021.  Patented Sept. 18, 1894.
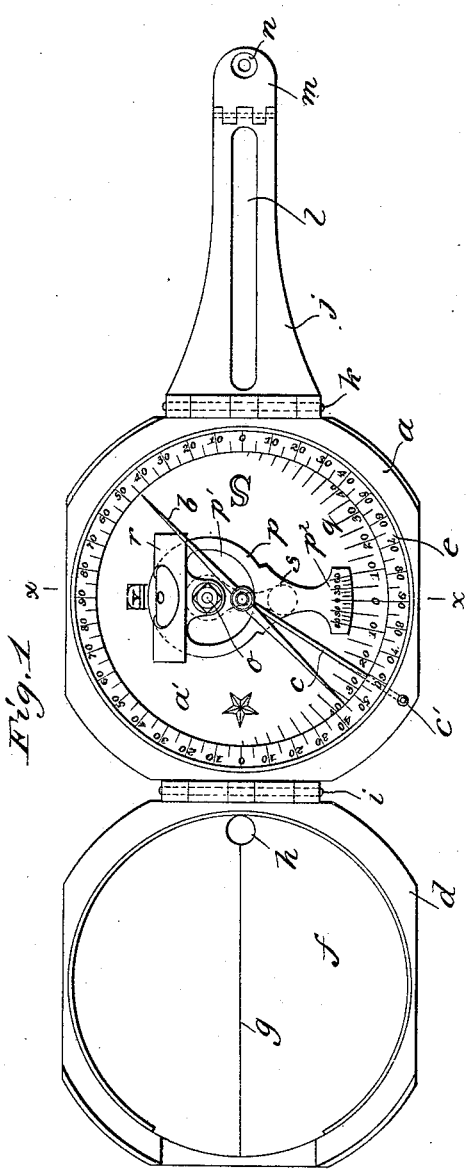
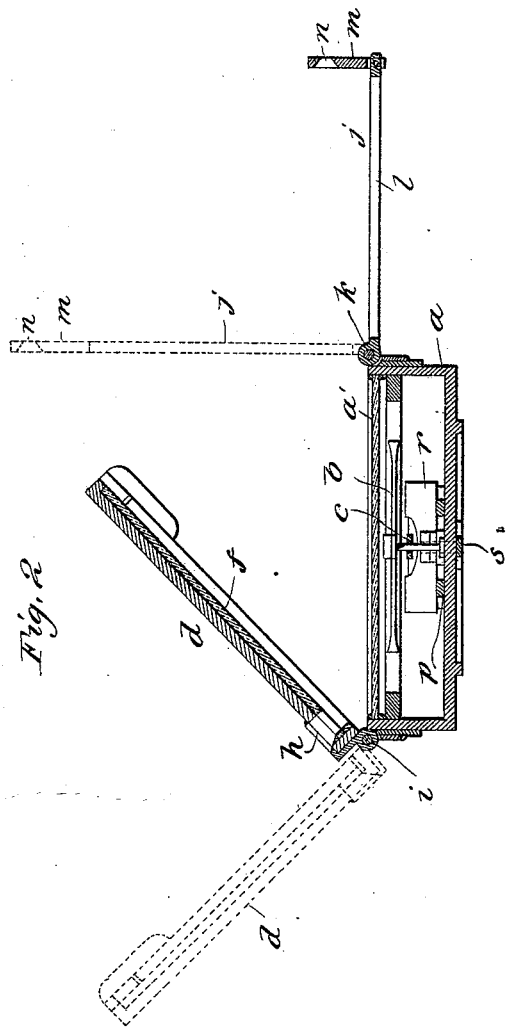
Witnesses
E. A. Finckel
J. F. Coleman
Inventor
David W. Brunton
by Wm. N. Finckel
his Atty.

(No Model.) 2 Sheets—Sheet 2.

D. W. BRUNTON.
POCKET TRANSIT.

No. 526,021. Patented Sept. 18, 1894.

Witnesses
J. F. Coleman
E. A. Finnell

Inventor
David W. Brunton
by W. H. Finnell
his Atty.

UNITED STATES PATENT OFFICE.

DAVID W. BRUNTON, OF ASPEN, COLORADO.

POCKET-TRANSIT.

SPECIFICATION forming part of Letters Patent No. 526,021, dated September 18, 1894.

Application filed March 10, 1894. Serial No. 503,114. (No model.)

*To all whom it may concern:*

Be it known that I, DAVID W. BRUNTON, a subject of the Queen of Great Britain, but having declared my intention of becoming a citizen of the United States, residing at Aspen, in the county of Pitkin and State of Colorado, have invented a certain new and useful Improvement in Pocket-Transits, of which the following is a full, clear, and exact description.

The object of this invention is to provide an apparatus or instrument by means of which surveyors and others may take sights above and below the horizontal. In the ordinary surveying compass provided with sights, it is not possible to take the reading of the needle while looking through the sights at a distant object, and heretofore in order to take compass bearings, it has been necessary to provide the instrument with a tripod or Jacob's-staff, so that it could be first sighted upon the object and then the reading taken afterward; and when used as a hand instrument two observers were required, one to sight the instrument on the object whose bearing was to be taken, and the other to take a simultaneous reading of the needle. The simultaneous sighting and reading of a compass can also be attained by an instrument known as the prismatic compass, but its use has been extremely limited and the results obtained very inaccurate, because, first, the prismatic compass will only take sights on or near a level with the instrument, and, second, the weight of the needle is greatly increased and its accuracy impaired by carrying a large circular card, and, third, the prism obscures the light and only indifferent results can be obtained reading by candle light under ground. So far as I am aware, no small portable instrument for taking both horizontal and vertical angles has hitherto been produced. Instruments for taking vertical angles and clinometer readings are in general use, but no successful attempt, so far as I am aware, has yet been made to combine them with a compass or other instrument for taking horizontal angles.

In my device, which I designate a pocket transit and wherein I dispense with the use of a Jacob's-staff or a tripod, I have provided means for taking both horizontal and vertical angles and for obtaining clinometer readings, and have made the instrument sufficiently small and light to be carried in the vest pocket. The instrument comprises a casing containing a magnetic compass, an adjustable sight for use in horizontal and vertical readings, a lid or cover hinged to the casing and provided on its inside with a mirror and a sight-line, and a bubble tube provided with a vernier. The sides of the casing and lid are made flat, so that the instrument may be used as a clinometer.

Having thus stated the principle of my invention, I will proceed to set forth the best mode in which I have contemplated applying that principle, and then will particularly point out and distinctly claim the part or improvement which I claim as my invention.

Figure 4:
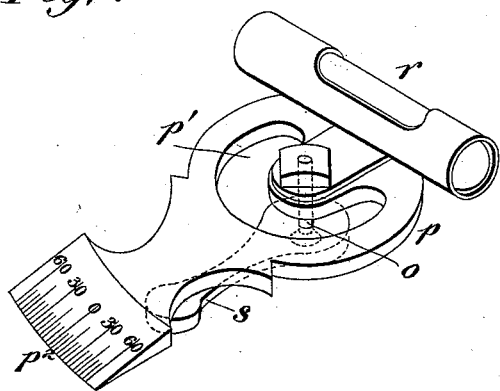

In the accompanying drawings illustrating my invention, in the figures of which like parts are similarly designated, Figure 1 is a plan view of the parts open; and Fig. 2 is a vertical section showing the parts in full lines arranged for taking vertical readings, and, also, showing the parts in dotted lines for taking horizontal readings. Fig. 3 is a transverse section of the instrument closed, taken in the plane of line $x$—$x$ Fig. 1 and looking toward the left, and Fig. 4 is a perspective view of the bubble tube, vernier arm and operating crank, on a larger scale.

$a$ is the casing, which may be of aluminum, or other substance or material of appropriate character to receive the needle $b$ of a magnetic compass, which needle may be mounted in any usual manner, and be provided with the locking lever $c$, which, as here shown, projects up from the face of the casing at $c'$ so as to be operated by the closing of the lid $d$.

$e$ is a degree circle for the compass, suitably divided and subdivided, the drawing showing the circle divided into multiples of five. The lid or cover $d$ is provided on its inside with a mirror $f$, in the center of which is the sight-line $g$, which terminates at its inner end in a sight-opening $h$, the said lid or cover being hinged to the casing at $i$ in any suitable manner. At the opposite side of the casing is arranged an adjustable folding sight $j$ which may be hinged to the said casing at $k$ in any suitable manner. This folding sight is provided with a longitudinal slot $l$ in line with the sight-line $g$. The outer end of this folding sight is provided with a hinged piece $m$, which has a sight-opening $n$ therein, the said hinged piece being adapted to be turned up at right angles to the sight $j$, as indicated in the full lines in Fig. 2. This hinged and folding sight is of a length sufficient to be folded within the casing and over the glass face $a'$ of such casing. Within the bottom of the casing is arranged a post $o$ eccentrically thereof, and upon this post is pivoted an arm $p$, which is slotted at $p'$, to encircle the base of the needle and work around it. This arm $p$ terminates in a vernier $p^2$ which is arranged over an appropriate vernier scale $q$. The opposite end of this arm is supplied with a bubble tube $r$. The post $o$ extends through to the rear side of the casing and is provided with a crank lever or handle $s$, by means of which the bubble tube and its connected vernier may be adjusted to obtain levels.

Some of the uses of this instrument may be stated as follows: By placing the folding sight $j$ at right angles with the top of the casing, as indicated in dotted lines in Fig. 2, and the lid $d$ at an angle of one hundred and thirty-five degrees from the top of the casing and holding the instrument firmly in the two hands in a horizontal position at about the height of the waist, an observer, by looking directly down into the mirror, will see the objects in front of him reflected therein. The instrument may be accurately sighted at any one of these objects by bringing it in line with the sight-line $g$, bisecting the opening or slot $l$ in the folding sight, and, at the same time, the needle reading may be accurately taken by the same observer. By varying the position of the lid or cover and the folding sight, courses may be taken to objects situated at almost any angle above and below the observer. To take vertical angles, the instrument is held edge up, and the lid or cover is set to approximately an angle of forty-five degrees with the top of the casing and the folding sight turned outwardly until it is parallel with the top of the casing and its hinged end $m$ then turned out at right angles to the sight, all as indicated in full lines in Fig. 2, and then by holding the lid or cover with the left hand and the casing between the fore finger and thumb of the right hand, and placing the end $m$ close to the eye so as to look through the opening $n$ therein, sights can be taken through such opening and the opening $h$ in the lid or cover, while, at the same time, the bubble tube can be plainly seen in the mirror. In measuring vertical angles above and below the horizontal, it is only necessary then to turn the crank $s$ on the bottom of the instrument with the second finger of the right hand so as to bring the bubble to the center of the bubble tube, after which the cover may be opened and the reading taken from the vernier circle on the bottom of the casing.

Inasmuch as the cover and the casing are of exactly the same width and flat on their sides, it is obvious that when the lid is opened so that it is parallel with the face of the casing, as in Fig. 1, by applying the instrument edgewise to an object the instrument may be used as a clinometer.

Other uses of this instrument will readily suggest themselves to those skilled in the art, but the above are deemed to be sufficient to indicate its general purposes and usefulness.

I am well aware that prior to my invention, surveying instruments with folding sights have been made, and also instruments for taking vertical angles, and hence, I do not claim either of these instruments, separately considered, but

What I claim is—

1. A pocket transit having a body provided with a magnetic compass, the mirror-lined lid or cover provided with a sight-line, and a folding sight provided with a longitudinal sight-slot, combined as and for the purpose described.

2. A pocket transit comprising a body having a bubble tube, vernier and scale, a folding sight provided with a hinged end having a sighting aperture, and a mirror-lined hinged lid or cover having a sight opening, substantially as and for the purpose described.

3. A pocket transit provided with a bubble tube having a vernier arm and an operating crank arranged on the outside of the instrument, an adjustable mirror-lined lid or cover having a sight opening and a folding sight provided with a right-angled end having a sighting aperture, substantially as described.

4. A pocket transit comprising a magnetic needle, a bubble tube, a movable arm arranged eccentrically within the casing of the instrument and slotted to surround the post of the needle, whereby the bubble tube may be rotated through an arc of one hundred and eighty degrees without interference with the needle post, a vernier on said arm and a crank arranged on the outside of the casing and adapted to be actuated by a finger of the hand holding the instrument, substantially as described.

5. In a pocket transit, the combination of the body or casing, the mirror-lined lid hinged thereto, the folding sight jointed to said body and provided with a hinged end, a bubble tube pivoted within said body and connected with a vernier arm and its scale, and an external crank for adjusting the bubble tube, substantially as described.

6. In a pocket transit, a casing containing a magnetic needle and a degree circle, a mirror-lined lid or cover hinged to said casing and provided with a sight-line, and a sight hinged to said casing opposite the lid and adapted to be folded in between the casing and cover or lid, substantially as described.

7. A pocket transit comprising a casing and a hinged lid of the same width, and having flat sides, and an adjustable bubble tube within the casing, whereby the instrument may be used as a clinometer, substantially as described.

In testimony whereof I have hereunto set my hand this 6th day of March, A. D. 1894.

DAVID W. BRUNTON.

Witnesses:
 CHAS. E. ANDERSON, Jr.,
 WM. B. RAFF.